United States Patent
Wieclawski (10) Patent No.: US 7,963,608 B2
(45) Date of Patent: Jun. 21, 2011

(54) VEHICLE SEAT ASSEMBLY CAPABLE OF PERFORMING AN EASY ENTRY FUNCTION AND MEMORY RETURN

(75) Inventor: Stanislaw Andrzej Wieclawski, Hohenkammer (DE)

(73) Assignee: Lear Corporation, Southfield, MI (US)

( * ) Notice: Subject to any disclaimer, the term of this patent is extended or adjusted under 35 U.S.C. 154(b) by 387 days.

(21) Appl. No.: 12/277,910

(22) Filed: Nov. 25, 2008

(65) Prior Publication Data

US 2009/0218871 A1 Sep. 3, 2009

(30) Foreign Application Priority Data

Feb. 28, 2008 (DE) .......................... 10 2008 011 646

(51) Int. Cl.
*B60N 2/20* (2006.01)
(52) U.S. Cl. ................................... 297/378.12; 297/341
(58) Field of Classification Search .................. 297/341, 297/378.12
See application file for complete search history.

(56) References Cited

U.S. PATENT DOCUMENTS

| | | | |
|---|---|---|---|
| 3,953,069 A * | 4/1976 | Tamura et al. ............ | 297/367 R |
| 4,660,886 A * | 4/1987 | Terada et al. ............ | 297/367 R |
| 5,100,092 A | 3/1992 | Sovis | |
| 5,522,643 A * | 6/1996 | Matsuura ................. | 297/367 R |
| 5,855,349 A | 1/1999 | Nini et al. | |
| 5,899,532 A | 5/1999 | Paisley et al. | |
| 6,106,067 A * | 8/2000 | Zhuang et al. ............ | 297/361.1 |
| 6,139,104 A * | 10/2000 | Brewer ..................... | 297/353 |
| 6,513,868 B1 | 2/2003 | Tame | |
| 6,739,668 B2 * | 5/2004 | Coman et al. ............ | 297/378.12 |
| 7,014,265 B2 * | 3/2006 | Yamada et al. ........... | 297/367 R |
| 7,097,250 B2 | 8/2006 | Rausch et al. | |
| 7,503,099 B2 * | 3/2009 | Pejathaya ................. | 16/324 |
| 7,578,556 B2 * | 8/2009 | Ohba et al. ................ | 297/366 |
| 7,871,128 B2 * | 1/2011 | Bonk et al. ............... | 297/378.12 |
| 2003/0080600 A1* | 5/2003 | Eppert ...................... | 297/367 |
| 2004/0164600 A1 | 8/2004 | Rausch et al. | |

FOREIGN PATENT DOCUMENTS

| | | |
|---|---|---|
| DE | 4235078 A1 | 4/1994 |
| DE | 10031640 A1 | 1/2001 |
| DE | 20122218 U1 | 10/2004 |
| DE | 102005050475 A1 | 9/2006 |

OTHER PUBLICATIONS

German Office Action dated Jul. 24, 2008, 6 pages.

(Continued)

*Primary Examiner* — Peter R. Brown
(74) *Attorney, Agent, or Firm* — Brooks Kushman P.C.

(57) ABSTRACT

A vehicle seat assembly operable to perform an easy entry function includes a seat body adapted for attachment to a vehicle, the seat body having a seat back that is pivotally mounted to a seat bottom. A pivot lock mechanism inhibits the seat back from pivoting with respect to the seat bottom when locked. An easy entry actuator associated with the seat body is configured to unlock the pivot lock mechanism when actuated and to retain the pivot lock mechanism in an unlocked state while actuated. A retaining member associated with the easy entry actuator is configured to engage the seat back and to maintain the easy entry actuator in an actuated state after the easy entry actuator has been actuated until the seat back pivots to an angular orientation with respect to the seat bottom that the seat back occupied immediately prior to actuation of the easy entry actuator.

20 Claims, 5 Drawing Sheets

OTHER PUBLICATIONS

English Abstract for DE102005050475 A1, Sep. 2006.
English Abstract for DE10031640 A1, Jan. 2001.
English Abstract for DE4235078 A1, Apr. 1994.
English Abstract for DE20122218 U1, Oct. 2004.

* cited by examiner

Fig-7

VEHICLE SEAT ASSEMBLY CAPABLE OF PERFORMING AN EASY ENTRY FUNCTION AND MEMORY RETURN

CROSS-REFERENCE TO RELATED APPLICATIONS

This application claims foreign priority benefits under 35 U.S.C. §119(a)-(d) to DE 10 2008 011 646.7, filed Feb. 28, 2008, which is hereby incorporated by reference in its entirety.

BACKGROUND OF THE INVENTION

1. Field of the Invention

The field of the present invention relates to vehicle seat assemblies having an easy entry function wherein the seat back can be adjusted through a comfort range, and wherein after the easy entry function is performed, the seat back can be returned to the position that the seat back occupied immediately prior to actuation of the easy entry function.

2. Background Art

A vehicle seat assembly capable of performing an easy entry function is disclosed herein. Examples of vehicle seat assemblies capable of performing easy entry functions are disclosed in U.S. Patent Nos. 7,097,250; 6,513,868; 5,899,532; 5,855,349; and 5,100,092.

SUMMARY OF THE INVENTION

A vehicle seat assembly operable to perform an easy entry function is disclosed herein. In a first embodiment, the vehicle seat assembly includes a seat body adapted to be attached to a vehicle. The seat body has a seat back that is pivotally mounted to a seat bottom. A pivot lock mechanism is connected to the seat body. The pivot lock mechanism inhibits the seat back from pivoting with respect to the seat bottom when the pivot lock mechanism is locked. The pivot lock mechanism permits the seat back to pivot when the pivot lock mechanism is unlocked. An easy entry actuator is associated with the seat body and is configured to unlock the pivot lock mechanism when actuated. The easy entry actuator is further configured to retain the pivot lock mechanism in an unlocked state while actuated. A retaining member associated with the easy entry actuator is configured to engage the seat back and to maintain the easy entry actuator in an actuated state after the easy entry actuator has been actuated until the seat back pivots to angular orientation with respect to the seat bottom that the seat back occupied immediately prior to actuation of the easy entry actuator.

In at least one implementation of the first embodiment, the retaining member may be configured to move between a plurality of positions and the position of the retaining member corresponds to the angular orientation of the seat back with respect to the seat bottom while the retaining member and the seat back are engaged.

In some variations, the seat back may have an engagement member that engages the retaining member. The engagement member moves the retaining member between the plurality of positions as the seat back pivots. The retaining member may have a notch defined in a surface of the retaining member. The engagement member may be configured to fit within the notch and to move the retaining member through engagement with the notch. The retaining member and the engagement member is configured to disengage when the easy entry actuator is actuated and the engagement member and the retaining member is further configured to re-engage when the seat back returns to the angular orientation with respect to the seat bottom that the seat back occupied immediately prior to actuation of the easy entry actuator.

In another variation, the vehicle seat assembly may further comprise a friction member associated with the retaining member wherein the retaining member contacts the friction member. Friction between the friction member and the retaining member may inhibit the retaining member from moving between the plurality of positions until the retaining member is moved by the engagement member. In another variation, the seat back may be configured to pivot through a defined range and the plurality of positions may correspond to a portion of the defined range that is less than the entire defined range. plurality of positions may correspond to a portion of the defined range that is less then the entire defined range.

In a further variation, the defined range has a first end and a second end. The seat back may be disposed in a fully reclined position at the first end and may be disposed in an easy entry position at the second end. In this variation, the plurality of positions does not include a position that corresponds with either the fully reclined position or the easy entry position.

In a further variation, the vehicle seat assembly may further comprise a biasing member associated with the retaining member. The retaining member may be configured to pivot between a first angle and a second angle. The biasing member may urge the retaining member towards the first angle. An upper surface of the retaining member may define a notch and the engagement member may be configured to fit within the notch and to move the retaining member through engagement with the notch. A portion of the retaining member proximate the notch may be configured to form a camming surface and the engagement member may engage the camming surface as the seat back pivots forward, causing the retaining member to pivot away from the first angle. The retaining member may return to the first angle once the engagement member aligns with and engages the notch.

In a second embodiment, the vehicle seat assembly includes a seat body that is adapted to be attached to a vehicle, the seat body having a seat back that is pivotally mounted to a seat bottom. A pivot lock mechanism is connected to the seat body, the pivot lock mechanism inhibiting the seat back from pivoting with respect to the seat bottom when locked. An easy entry actuator is associated with the seat body. The easy entry actuator unlocks the pivot lock mechanism when actuated and retains the pivot lock mechanism in an unlocked state while actuated. A comfort adjustment actuator is associated with the seat body. The comfort adjustment actuator unlocks the pivot lock mechanism when actuated. A blocking member is connected to the easy entry actuator. The blocking member is moveable between an obstructing position that obstructs the seat back from pivoting forward beyond a predetermined position and a non-obstructing position that does not obstruct the seat back. A retaining member is connected to the blocking member and configured to move with respect to the blocking member between a plurality of positions. The retaining member is further configured to engage the seat back as the seat back pivots and to move through the plurality of positions when engaged with the seat back as the seat back pivots such that the position of the retaining member corresponds to an angle of the seat back with respect to the seat bottom. Actuation of the comfort adjustment actuator does not move the blocking member out of the obstructing position. Actuation of the easy entry actuator does move the blocking member out of the obstruction position. The seat back, the retaining member and the blocking member cooperate to retain the easy entry actuator in an actuated state when the seat back pivots forward beyond the predetermined point. The seat back, the retaining member, and the blocking member release the easy entry actuator from the actuated state when the seat back pivots rearward to a position that the seat back occupied immediately prior to actuation of the easy entry actuator.

In an implementation of the second embodiment, the blocking member includes a mounting member. The retaining member may be slidably mounted on the mounting member. The retaining member is configured to slide with respect to the blocking member between the plurality of positions. The mounting member may be configured to substantially inhibit the retaining member from rotating with respect to the blocking member. In a variation, the retaining member is disposed in contact with the mounting member. Friction between the mounting member and the retaining member restrains the retaining member from sliding. Movement of the seat back while engaged with the retaining member overcomes the friction restraining the retaining member. In another variation, the vehicle seat assembly further comprises a friction member disposed in contact with the retaining member. Friction between the friction member and the retaining member restrains the retaining member from sliding. Movement of the seat back while engaged with the retaining member overcomes the friction restraining the retaining member.

In another variation, the seat back includes an engagement member. The blocking member engages the engagement member to obstruct the seat back from pivoting forward beyond the predetermined point. A surface of the retaining member defines a notch configured to receive the engagement member. The seat back moves the retaining member between the plurality of positions through engagement between the engagement member and the notch. In a further variation, the blocking member is pivotally mounted to the seat body and pivots between the obstructing position and the non-obstructing position. The retaining member pivots together with the blocking member. Actuation of the easy entry actuator moves the retaining member such that the notch comes out of engagement with the engagement member. Forward movement of the seat back subsequent to actuation of the easy entry actuator causes the engagement member to slide along an upper surface of the retaining member which, in turn, obstructs the blocking member from pivoting back to the obstructing position. In this manner, the blocking member remains in the non-obstructing position until the seat back pivots rearward to a point where the engagement member re-engages the notch.

In a further variation, the seat back is configured to pivot through a defined range having a first end and a second end. The seat back is disposed in a fully reclined position when at the first end and is disposed in an easy entry position when at the second end. The plurality of positions does not include a position that corresponds with either the fully reclined position or the easy entry position.

In a further variation, a surface of the blocking member defines a slot. The easy entry actuator includes a pin extending from a surface of the easy entry actuator. The pin is disposed within the slot and the easy entry actuator is configured to move the blocking member from the obstructing position to the non-obstructing position through engagement between the pin and the slot. In another variation, the vehicle seat assembly further includes a biasing member that urges the blocking member towards the obstructing position.

In another variation, a first surface of the pin is proximate a first wall of the slot. A second surface of the pin is proximate a second wall of the slot. A width of the slot exceeds a diameter of the pin. The biasing member urges the first wall of the slot against the first surface of the pin. A gap is formed between the second surface of the pin and the second wall of the slot. The gap permits the blocking member to pivot within a play range without actuation of the easy entry actuator. This configuration permits the engagement member to engage the notch when the seat back pivots forward from the first end.

In a third embodiment, the vehicle seat assembly includes a seat body that is adapted to be attached to a vehicle. The seat body has a seat back pivotally mounted to a seat bottom. The seat back has an engagement member. A pivot lock mechanism is connected to the seat body. The pivot lock mechanism inhibits the seat back from pivoting with respect to the seat bottom when a pivot lock mechanism is locked. An easy entry actuator is associated with the seat body that unlocks the pivot lock mechanism when actuated. The easy entry actuator retains the pivot lock mechanism in an unlocked state while the easy entry actuator is actuated. The easy entry actuator has a pin protruding from a surface of the easy entry actuator. A comfort adjustment actuator is associated with the seat body. The comfort adjustment actuator unlocks the pivot lock mechanism when actuated. A blocking member is connected to the easy entry actuator. The blocking member is pivotable between an obstructing position that engages the engagement member to obstruct the seat back from pivoting forward beyond a predetermined position and a non-obstructing position that does not obstruct the engagement member. The easy entry actuator moves the blocking member to the non-obstructing position when the easy entry actuator is actuated. The blocking member has a surface having a slot defined therein. The slot receives the pin and the blocking member is configured to move from the obstructing position to the non-obstructing position as the pin moves from a first end of the slot to a second end of the slot when the easy entry actuator is actuated. The blocking member is configured to retain the easy entry actuator in the actuated state while the blocking member is in the non-obstructing position through engagement of the slot and the pin. The slot has a width that exceeds a width of the pin such that a gap is disposed between a wall of the slot and a surface of the pin. The gap permits the blocking member to pivot through a play range that is less than a range between the obstructing position and the non-obstructing position. A retaining member is slidably connected to the blocking member and configured to slide with respect to the blocking member between a plurality of positions. The retaining member is further configured to engage the engagement member and to move through the plurality of positions when engaged with the engagement member such that the position of the retaining member corresponds to an angle of the seat back with respect to the seat bottom. Actuation of the easy entry actuator moves the blocking member out of the obstructing position. The engagement member, the retaining member, and the blocking member cooperate to retain the easy entry actuator in an actuated state when the seat back pivots forward of the predetermined position. The engagement member, the retaining member, and the blocking member release the easy entry actuator from the actuated state when the seat back pivots rearward to a position that the seat back occupied immediately prior to actuation of the easy entry actuator. Actuation of the comfort adjustment actuator does not move the blocking member out of the obstructing position. The engagement member causes the blocking member to pivot through the play range when the engagement member engages the blocking member as the seat back pivots forward to the predetermined position. The pivoting of the blocking member through the play range results in a soft stop for the seat back as the seat back pivots forward to the predetermined position.

BRIEF DESCRIPTION OF THE DRAWINGS

The description herein makes reference to the accompanying drawing wherein like reference numerals refer to like parts through the several views, and in which:

FIG. 4 is a plan view illustrating the latch assembly of FIG. 2 subsequent to actuation of an easy entry feature of the vehicle seat assembly;

FIG. 5 is a plan view of a portion of the actuator assembly of FIG. 2;

FIGS. 6A-6B are plan views illustrating a soft stop feature of the actuator assembly of FIG. 2.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

FIGS. 1 through 7 illustrate various applications, conditions and embodiments of a vehicle seat assembly operable to perform an easy entry function. As used herein, the term "easy entry" function refers to an operation of the vehicle seat assembly wherein the seat back pivots to a forward angle that is generally forward of a perpendicular orientation with respect to the seat bottom and wherein forward pivot of the seat back beyond the perpendicular will trigger release of a slide lock mechanism that permits the seat back to slide forward. In some embodiments, the vehicle seat assembly may be configured to pivot through a comfort range which includes angles of a seat back with respect to a seat bottom that a seat occupant may find comfortable while occupying the vehicle seat assembly. In some embodiments, the actuator used to pivot the seat back through the comfort range will not actuate the vehicle seat assembly's easy entry function. The purpose of an easy entry function is, generally, to permit ingress and egress from an area of a passenger compartment of a vehicle disposed rearward of the vehicle seat assembly. For the comfort and convenience of the occupant of the vehicle seat assembly, it may be desirable to equip the vehicle seat assembly with a memory feature which permits the seat back to be returned to the reclined position that the seat back occupied immediately prior to actuation of the easy entry function.

Figure 1:
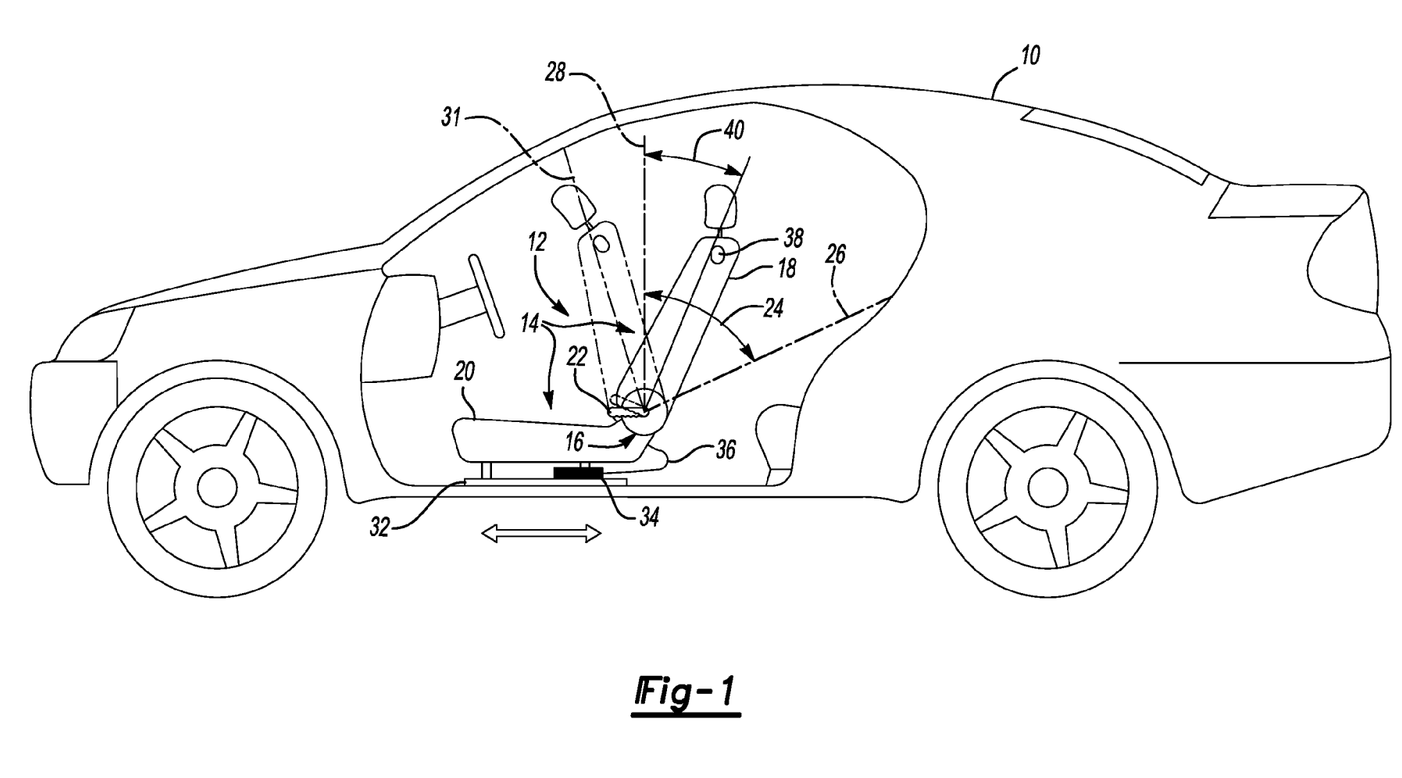
FIG. 1 is a schematic view illustrating a vehicle equipped with an embodiment of a vehicle seat assembly made in accordance with the present invention.

With reference to FIG. 1, a vehicle 10 is illustrated. Although vehicle 10 is illustrated as a two door passenger car, it should be understood that the teachings of the present invention are not limited to usage with a two door passenger car, but rather, may be employed in other vehicles including, but not limited to, sport utility vehicles, mini-vans, crossover utility vehicles, wagons, convertibles, and pickup trucks. It should also be understood that the teachings of the present invention are not limited to use with automobiles. Rather, the teachings of the present invention are compatible with all manner of vehicles including aircraft, water craft, spacecraft and other land craft including rail driven vehicles.

Vehicle 10 is equipped with vehicle seat assembly 12 which includes a seat body 14 and an actuator assembly 16. Seat body 14 includes a seat back 18 and a seat bottom 20. Seat back 18 is connected to seat bottom 20 and is configured to pivot with respect to seat bottom 20. A pivot lock mechanism 21 (see FIG. 2) is configured to move between a locked position and an unlocked position. When locked, pivot lock mechanism 21 inhibits seat back 18 from pivoting. Actuator assembly 16 is disposed between seat back 18 and seat bottom 20 and controls the pivotal movement of seat back 18.

A comfort adjuster 22 is attached to actuator assembly 16 and is configured to actuate seat back 18 to pivot through a comfort range 24. When comfort adjuster 22 is pulled by an occupant of vehicle seat assembly 12, pivot lock mechanism 21 is unlocked and the occupant may adjust the position of seat back 18 to any angular orientation with respect to seat bottom 20 that falls within comfort range 24. Comfort range 24 includes a range of positions between rear most angle of recline 26 and a substantially upright position 28, also referred to herein as the predetermined position. Actuation of comfort adjuster 22 does not permit seat back 18 to pivot forward of the predetermined position. recline 26 and a substantially upright position 28, also referred to herein as the predetermined position. Actuation of comfort adjuster 22 does not permit seat back 18 to pivot forward of the predetermined position.

An easy entry actuator 30 (see FIG. 2) permits seat back 18 to pivot forward of the predetermined position to an easy entry position 31. In the illustrated embodiment, vehicle seat assembly 12 is slidably mounted on vehicle 10 by rails 32. Sliding motion between vehicle seat assembly 12 and vehicle 10 is controlled by slide lock mechanism 34 which alternately locks and releases vehicle seat assembly 12 to slide along rails 32. As seat back 18 pivots forward of the predetermined point towards the easy entry position 31, slide lock mechanism 34 is unlocked and vehicle seat assembly 12 is free to slide forward along rails 32. In at least one embodiment, a cable 36 connects seat back 18 to slide lock mechanism 34 and upon seat back 18 pivoting forward of the predetermined position, cable 36 tightens and pulls on slide lock mechanism 34, unlocking it. A remote actuator 38 is connected to easy entry actuator 30. Remote actuator 38 is conveniently disposed on an upper, outboard portion of seat back 18 to allow a rear seat occupant to easily access remote actuator 38, whether standing outside the vehicle or sitting behind vehicle seat assembly 12.

When easy entry actuator 30 is actuated, pivot lock mechanism 21 is moved to the unlocked position and seat back 18 is free to pivot. So long as easy entry actuator 30 remains in an actuated position, pivot lock mechanism 21 remains unlocked and seat back 18 remains free to pivot. After ingress or egress from the passenger compartment, seat back 18 may be pivoted rearward. In at least some embodiments of the present invention, actuator assembly 16 is configured to permit seat back 18 to return to substantially the same angular orientation that seat back 18 occupied prior to actuation of the easy entry actuator before pivot lock mechanism is allowed to return to the locked state. This feature is referred to herein as the memory feature.

In some embodiments of the present invention, a memory area 40 is coextensive with comfort range 24. In such embodiments, seat back 18 will be permitted to return to any angular orientation with respect to seat bottom 20 that falls within comfort range 24. In other embodiments, memory area 40 is a subset of comfort area 24. In such embodiments, actuation of the easy entry function from an area within comfort range 24 that is outside of memory area 40 will not permit seat back 18 to be returned to its initial angular orientation after the easy entry function has been performed. Conversely, if the easy entry function is triggered while seat back 18 is initially within memory area 40, then seat back 18 may return to that initial position before pivot lock mechanism 21 locks.

Figure 2:
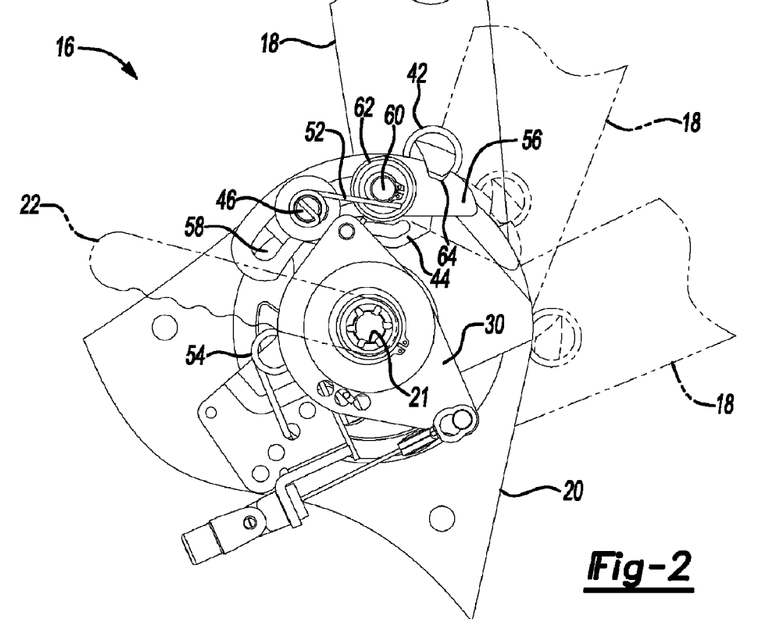
FIG. 2 is a side view illustrating an embodiment of an actuator assembly for use with the vehicle seat assembly of FIG. 1.
Figure 3:
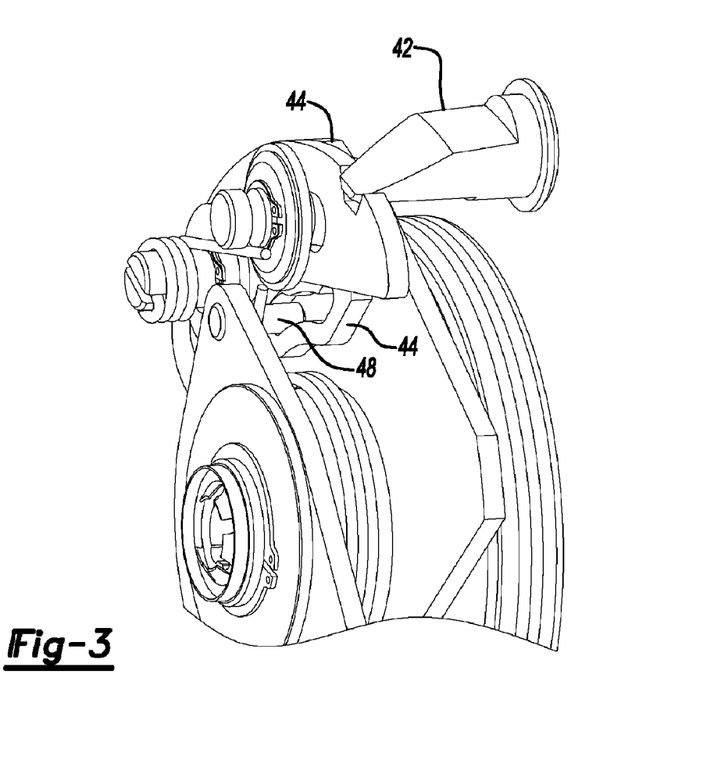
FIG. 3 is a perspective view illustrating the actuator assembly of FIG. 2.
Figure 4:
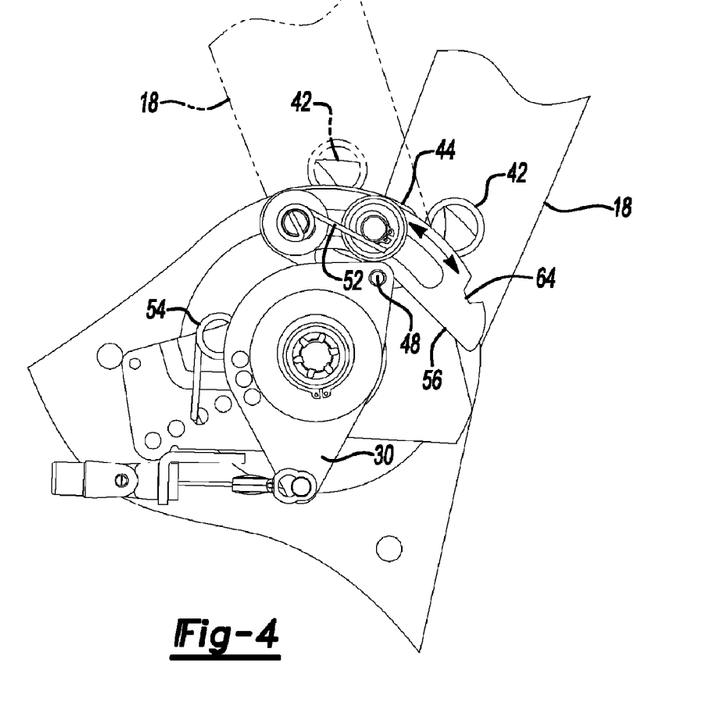
FIG. 4 is a side view illustrating the actuator assembly of FIG. 2 subsequent to actuation of an easy entry feature of the vehicle seat assembly.

With respect to FIG. 2, a side view of actuator assembly 16 is illustrated. A portion of seat back 18 and seat bottom 20 are illustrated. Seat back 18 is illustrated in a generally upright position. Seat back 18 is also illustrated in various states of recline in phantom lines. Comfort adjuster 22 is also illustrated in phantom lines. Comfort adjuster 22 is configured to engage pivot lock mechanism 21. As pivot lock mechanism 21 is rotated in a clockwise direction, it unlocks and seat back 18 is free to pivot with respect to seat bottom 20. When a seat occupant lifts up on comfort adjuster 22, this unlocks pivot lock mechanism 21. Seat back 18 includes an engagement member 42. In the illustrated embodiment, engagement member 42 is a pin protruding in an outboard direction from seat back 18. Engagement member 42 is configured to engage various components of actuator assembly 16. One such component is blocking member 44. In the illustrated embodiment, blocking member 44 is a plate that is pivotally attached to actuator assembly 16. Blocking member 44 pivots about pin mount 46 between a first or blocking position as illustrated in FIG. 2 and a second or non-blocking position as illustrated in FIG. 4. While blocking member 44 is in the blocking position, blocking member 44 is disposed in a path followed by engagement member 42 as seat back 18 pivots through comfort range 24. When comfort adjuster 22 rotates pivot lock mechanism 21 in the clockwise direction, blocking member 44 remains in the blocking position. Thus, seat back 18 is inhibited from pivoting forward of the predetermined position 28 because of the obstruction between blocking member 44 and engagement member 42. The relative positioning of blocking member 44 with respect to engagement member 42 is best illustrated in FIG. 3.

As seen in FIG. 2, actuator assembly 16 includes easy entry actuator 30 which is configured to pivot with respect to actuator assembly 16. In FIG. 2, easy entry actuator 30 is illustrated prior to actuation. When actuated, actuator 30 pivots in a clockwise direction about pivot lock mechanism 21. As easy entry actuator 30 pivots in a clockwise direction, easy entry actuator 30 engages pivot lock mechanism 21, thus turning it in a clockwise direction which, in turn, unlocks pivot lock mechanism 21 and frees seat back 18 to pivot. As best seen in FIG. 3, easy entry actuator 30 includes a pin 48. Blocking member 44 includes a blocking member slot 50. Pin 48 is configured to fit within blocking member slot 50 and to engage blocking member slot 50 as easy entry actuator 30 pivots in a clockwise direction. As easy entry actuator 30 pivots clockwise, pin 48 travels along a generally circular arch and, through engagement with blocking member slot 50, causes blocking member 44 to pivot in a generally downward direction towards the non-blocking position. As blocking member 44 moves to the non-blocking position, blocking member 44 moves out of the path followed by engagement member 42 as seat back 18 pivots forward. FIG. 4 illustrates actuator assembly 16 subsequent to actuation of the easy entry feature. When blocking member 44 is moved to the non-blocking position, seat back 18 is free to pivot beyond the predetermined point and may pivot to easy entry position 31. As seat back 18 pivots forward to easy entry position 31, cable 36 is tightened and slide lock mechanism 34 is released thus freeing vehicle seat assembly 12 to slide forward along rails 32.

With reference to FIG. 4, as long as easy entry actuator 30 remains in an actuated state, pivot lock mechanism 21 remains unlocked and seat back 18 remains free to pivot. As long as blocking member 44 remains in the non-blocking position, easy entry actuator 30 is inhibited from returning to the un-actuated state because of the engagement between pin 48 and blocking member slot 50. When seat back 18 moves forward of the predetermined position, engagement member 42 is disposed above blocking member 44 and obstructs blocking member 44 from returning to the non-blocking position. Thus, so long as seat back 18 obstructs blocking member 44 from returning to the non-blocking position, seat back 18 remains free to pivot. Once seat back 18 pivots sufficiently rearward to clear the obstruction of blocking member 44, blocking member 44 returns to the non-blocking position under the urging of blocking member spring 52. Once blocking member 44 returns to the blocking position, easy entry actuator 30 pivots in a counterclockwise direction under the urging of easy entry actuator spring 54. When easy entry actuator 30 returns to a non-actuated state, pivot lock mechanism 21 returns to a locked position and seat back 18 is inhibited from further pivoting until comfort adjuster 22 or easy entry actuator 30 again unlocks pivot lock mechanism 21.

Another component of actuator assembly 16 illustrated in FIG. 2 is retaining member 56. In the illustrated embodiment, retaining member 56 is a plate disposed adjacent to blocking member 44. Retaining member 56 includes a retaining member slot 58. Retaining member 56 is slidably mounted with respect to blocking member 44 such that retaining member slot 58 is mounted to, and slides along, pin mount 46 and retaining member mount 60. In the illustrated embodiment, retaining member mount 60 protrudes from blocking member 44. Pin mount 46 and retaining member mount 60 cooperate to inhibit retaining member 56 from rotating with respect to blocking member 44. In other embodiments, a single elongate mounting member could be employed to replace pin mount 46 and retaining member mount 60. A washer 62 is disposed between an outboard end of retaining member mount 60 and retaining member 56. Washer 62 contacts retaining member 56 and, through friction, inhibits retaining member 56 from sliding freely with respect to blocking member 44.

Retaining member 56, through engagement of slot 58 with pin mount 46 and retaining member mount 60 can slide between a retracted position and an extended position. In FIG. 2, the extended position is illustrated in phantom lines. Retaining member 56 may slide along pin mount 46 and retaining member mount 60 when force is applied to retaining member 56 that is sufficient to overcome the friction acting on retaining member 56 by washer 62.

Retaining member 56 includes a notch 64 defined in an upper surface of retaining member 56. Notch 64 is configured to conform with a portion of engagement member 42. This engagement is best illustrated in FIG. 3. When engagement member 42 and notch 64 are engaged, movement of seat back 18 through comfort range 24 will exert force on retaining member 56 sufficient to overcome the friction inserted by washer 62 and will thus move retaining member 56 between its retracted and extended positions. As seat back 18 pivots through comfort range 24 while engagement member 42 is engaged with notch 64, the position of retaining member 56 corresponds to the position of seat back 18. In some embodiments, retaining member 56 may be long enough such that engagement member 42 and notch 64 remain engaged throughout the entire range between predetermined position 28 and rear most angle of recline 26. In the illustrated embodiment, retaining member 56 is not long enough to permit notch 64 and engagement member 42 to remain engaged throughout that range. The range of recline of seat back 18 through which engagement between engagement member 42 and notch 64 is possible will be referred to herein as the memory area. The range of the memory area is dependent upon the length of retaining member 56. In some embodiments, the memory areas may cover 25 degrees of pivot of seat back 18.

Retaining member 56 moves together with blocking member 44 as blocking member 44 pivots between the blocking position and the non-blocking position. This is best illustrated in FIG. 4. Thus, when easy entry actuator 30 is actuated, and blocking member 44 moves to the non-blocking position and retaining member 56, which descends out of engagement with engagement member 42, will remain extended to a position that corresponds to an angle of recline of seat back 18 at the time preceding actuation of easy entry actuator 30.

As seat back 18 moves forward, engagement member 42 travels along an upper surface of retaining member 56 and also along an upper surface of blocking member 44. While engagement member 42 is disposed above an upper surface of retaining member 56, seat back 18 remains frees to pivot. This is because retaining member 56 is precluded from rotating with respect to blocking member 44 and thus in a cantilever configuration, retaining member 56 retains blocking member 44 in the non-blocking position. This, in turn, retains easy entry actuator 30 in an actuated state which maintains pivot lock mechanism 21 in an unlocked state.

Friction between washer 62 and retaining member 56 holds retaining member 56 in a generally constant position with respect to blocking member 44. Once ingress or egress from the passenger compartment is accomplished, seat back 18 may be pivoted in the rearward direction. Once seat back 18 reaches the angle of recline that it occupied immediately prior to actuation of easy entry actuator 30, engagement member 42 aligns with notch 64. This alignment permits upward movement of retaining member 56. Retaining member 56, together with blocking member 44, is urged in an upward direction under the urging of blocking member spring 52. This permits easy entry actuator 30 to return to the non-actuated state which, in turn, allows pivot lock mechanism 21 to return to its locked state. In the manner described above, retaining member 56 permits seat back 18 to be returned to the same angle of recline that it occupied immediately prior to operation of the easy entry function of vehicle seat assembly 12 so long as the easy entry function is actuated while seat back 18 is disposed within the memory area.

Figure 5:
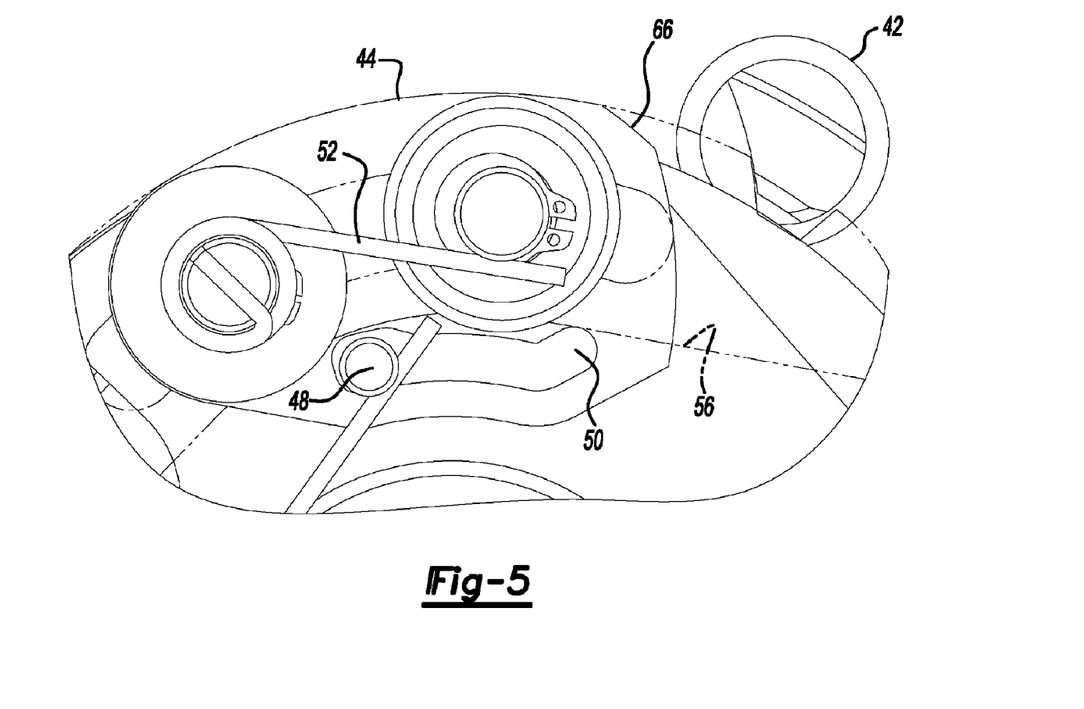
FIG. 5 is a magnified view of a portion of the actuator assembly of FIG. 2.

In embodiments where retaining member 56 does not have a length that corresponds to the entire range between predetermined position 28 and rear most angle of recline 26, engagement member 42 will come into and out of engagement with notch 64 as seat back 18 pivots into and out of the memory area. In the illustrated embodiment, the configuration of actuator assembly 16 facilitates engagement and disengagement of engagement member 42 with notch 64. This is best illustrated in FIG. 5. In this view, it can be seen that a width of blocking member slot 50 exceeds a diameter of pin 48. The difference between the width of slot 50 and the diameter 48 creates a gap between an upper surface of pin 48 and a wall of slot 50. This, in turn, provides blocking member 44 with some room or play in which to pivot in a downward direction before the wall of slot 50 contacts the upper surface of pin 48. In this manner, as seat back 18 is pivoted forward from a position rearward of the memory area, when seat back 18 reaches the memory area, engagement member 42 contacts an end of retaining member 56. In the illustrated embodiment, the end of retaining member 56 is generally tapered. This tapered shape acts as a camming surface and engagement member 42 pushes on retaining member 56 such that retaining member 56 moves downward and causes blocking member 44 to pivot slightly downward. This allows the end of retaining member 56 to move out of the path of engagement member 42 sufficiently far enough to permit engagement member 42 to reach notch 64. Once engagement member 42 aligns with notch 64, engagement member 42 comes out of contact with the tapered portion of retaining member 56 and retaining member 56 is moved in an upward direction under the urging of blocking member spring 52.

To facilitate the movement of seat back 18 rearward out of the memory area, a rear surface of slot 64 is canted at angle to act as a camming surface. As seat back 18 is pivoted in a rearward direction out of the memory area, engagement member 42 pushes against the rear camming surface of notch 64 and moves retaining member 56 out of the path of engagement member 42.

Figure 6A:
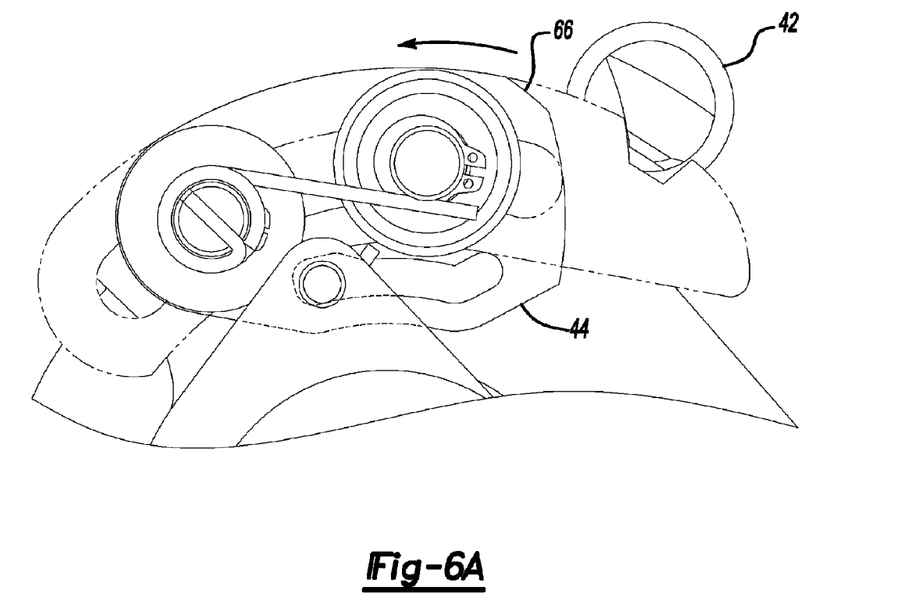
FIGS. 6A-6B are magnified views illustrating a soft stop feature of the actuator assembly of FIG. 2.
Figure 6B:
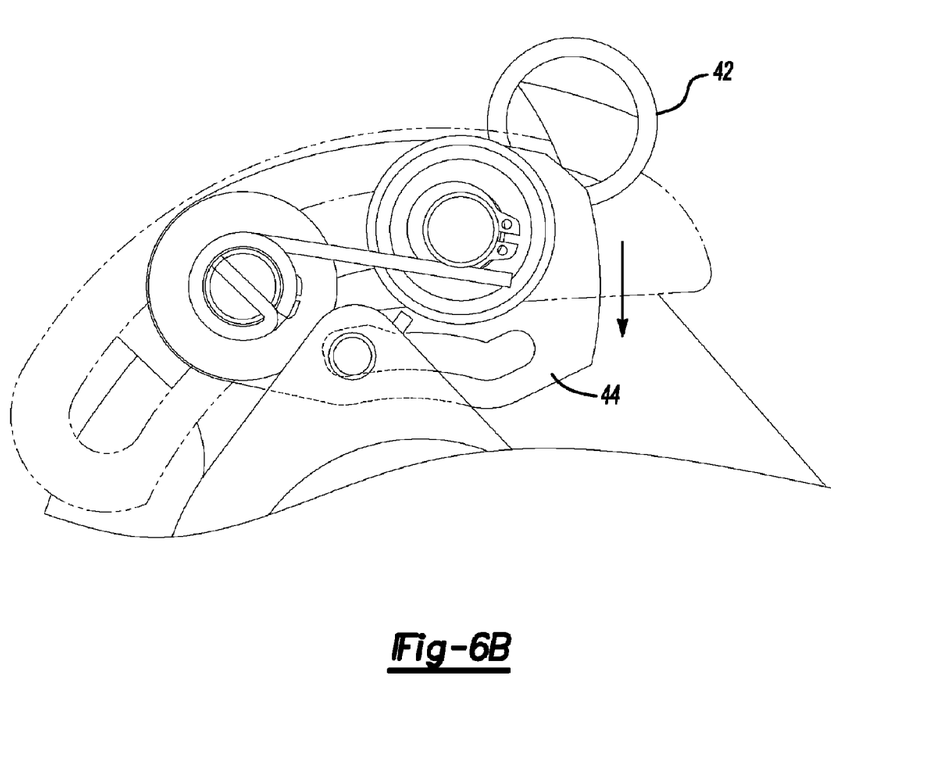

In some embodiments, actuator assembly 16 is configured to permit a "soft stop" of seat back 18 as seat back 18 pivots forward to predetermined position 28. In the illustrated embodiment, this is accomplished by placing a camming surface 66 on an upper rearward portion of blocking member 44. As seat back 18 pivots forward to predetermined position 28, engagement member 42 engages blocking member camming surface 66. Because of the angle of blocking member camming surface 66, the force of the impact of engagement member 42 with blocking member 44 causes blocking member 44 to move slightly towards the non-blocking position. This movement is possible because of the gap formed between the upper surface of pin 48 and the upper surface of slot 50. Because blocking member spring 52 urges blocking member 44 towards the blocking position, the pivotal movement of blocking member 44 is dampened by blocking member spring 52, thus providing a "soft stop" as seat back 18 reaches predetermined position 28. Without blocking member camming surface 66 and the gap between pin 48 and slot 50, seat back 18 would stop abruptly as engagement member 42 encounter blocking member 44. The soft stop feature is best illustrated in FIGS. 6A and 6B. FIG. 6A illustrates seat back 18 moving in a rearward direction, with engagement member 42 approaching blocking member 44. FIG. 6B shows the interaction of blocking member camming surface 66 with engagement member 42. Forward motion of seat back 18 has stopped and blocking member 44 has moved in a downward direction to dissipate the energy of the impact between engagement member 42 and blocking member 44.

Figure 7:
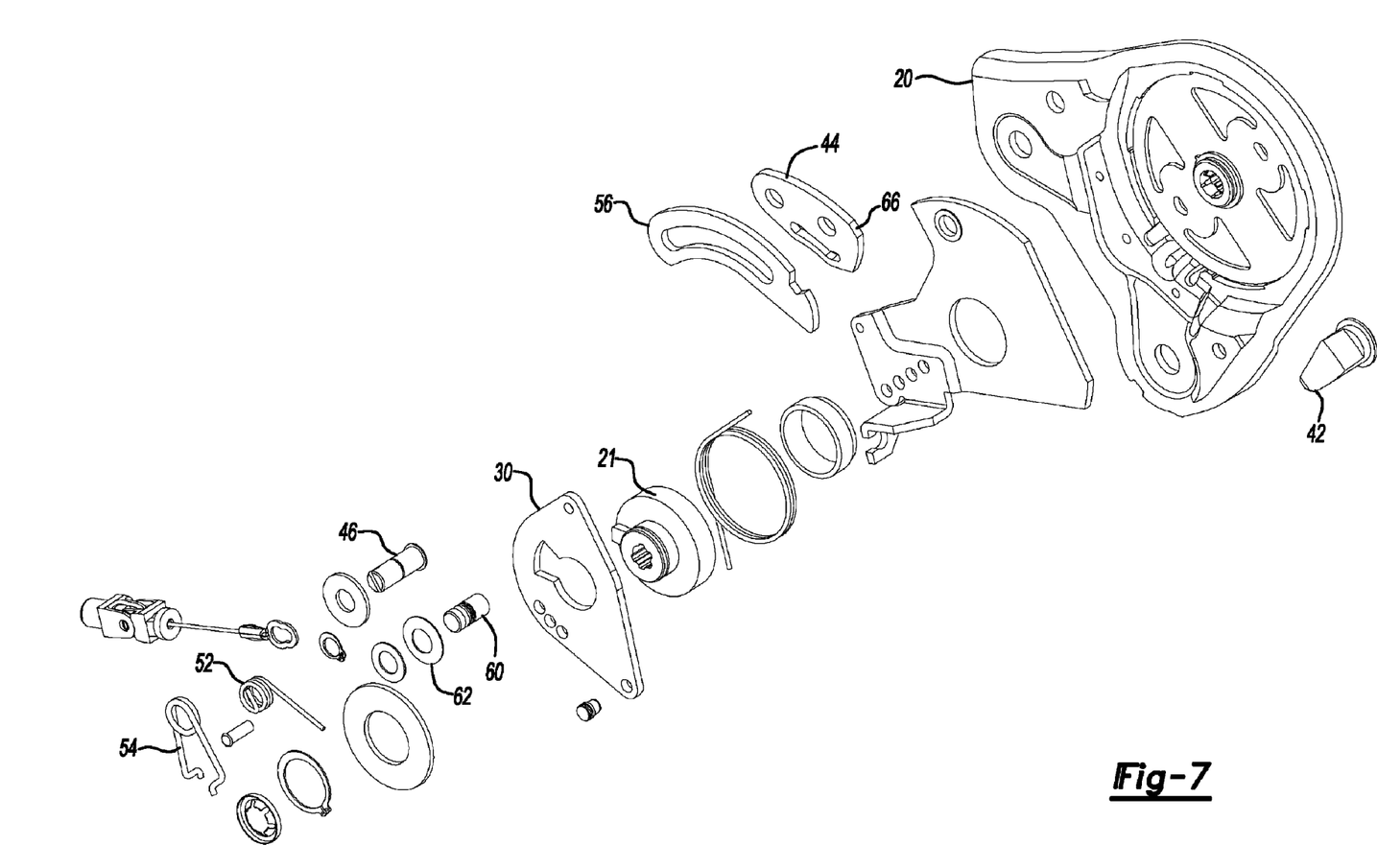
FIG. 7 is an exploded view of the actuator assembly of FIG. 2.

FIG. 7 is an exploded view illustrating the various components of actuator assembly 16. In the embodiment illustrated in FIG. 7, retaining member 56 has a length that does not correspond to the entire range of recline between predetermined position 28 and rear most angle of recline 26. Further, blocking member 44 includes blocking member camming surface 66 and is thus configured to perform the "soft stop" feature.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
a seat back pivotally mounted to a seat bottom, the seat back having an engagement member;

a pivot lock mechanism disposed proximate the seat bottom that inhibits the seat back from pivoting with respect to the seat bottom when locked and that permits the seat back to pivot when unlocked;

an easy entry actuator disposed on the pivot lock mechanism and configured to unlock the pivot lock mechanism when actuated and retain the pivot lock mechanism in an unlocked state while actuated;

a retaining member coupled to the easy entry actuator that engages the engagement member to maintain the easy entry actuator in an actuated state after the easy entry actuator has been actuated until the seat back pivots to an angular orientation with respect to the seat bottom that the seat back occupied immediately prior to actuation of the easy entry actuator, wherein the engagement member moves the retaining member between a plurality of positions as the seat back pivots; and a friction member associated with the retaining member, wherein the retaining member contacts the friction member and wherein friction between the friction member and the retaining member inhibits the retaining member from moving between the plurality of positions until the retaining member is moved by the engagement member.

2. The vehicle seat assembly of claim 1 wherein a position of the retaining member corresponds to an angular orientation of the seat back with respect to the seat bottom while the retaining member and the engagement member are engaged.

3. The vehicle seat assembly of claim 1 wherein the retaining member includes a slot that receives a pair of pins that extend from a blocking member that is pivotally disposed on the seat bottom.

4. The vehicle seat assembly of claim 1 wherein the retaining member has a notch that receives the engagement member.

5. The vehicle seat assembly of claim 1 wherein the retaining member and the engagement member disengage when the easy entry actuator is actuated and wherein the engagement member and the retaining member reengage when the seat back returns to an angular orientation with respect to the seat bottom that the seat back occupied immediately prior to actuation of the easy entry actuator.

6. The vehicle seat assembly of claim 1 wherein the friction member is a washer.

7. The vehicle seat assembly of claim 1 wherein seat back is configured to pivot through a defined range and wherein the plurality of positions corresponds to a portion of the defined range that is less than the entire defined range.

8. The vehicle seat assembly of claim 7 wherein the defined range has a first end and a second end, the seat back being disposed in a fully reclined position at the first end and being disposed in an easy entry position at the second end, and wherein the plurality of positions does not include a position that corresponds with either the fully reclined position or the easy entry position.

9. The vehicle seat assembly of claim 8, the vehicle seat assembly further comprising a biasing member associated with the retaining member, wherein the retaining member is configured to pivot between a first angle and a second angle, wherein the biasing member urges the retaining member towards the first angle, wherein an upper surface of the retaining member defines a notch, wherein the engagement member is configured to fit within the notch and to move the retaining member through engagement with the notch, wherein a portion of the retaining member proximate the notch is configured to form a camming surface and wherein the engagement member engages the camming surface as the seat back pivots forward, causing the retaining member to pivot away from the first angle, and the retaining member returning to the first angle once the engagement member aligns with and engages the notch.

10. A vehicle seat assembly comprising:
a seat back pivotally mounted to a seat bottom, the seat back having an engagement member;
a pivot lock mechanism disposed on the seat bottom that moves between a locked position in which pivoting of the seat back is inhibited and an unlocked position in which pivoting of the seat back is enabled;
an actuator assembly disposed on the seat bottom, the actuator assembly including:
an easy entry actuator rotatably disposed on the pivot lock mechanism, the easy entry actuator having a first pin;
a blocking member rotatably disposed on a second pin, the blocking member having a third pin and a slot that receives the first pin; and
a retaining member that has a retaining member slot that receives the third pin and has a notch for receiving the engagement member;
wherein the easy entry actuator moves the blocking member from a blocking position in which the seat back is inhibited from pivoting forward beyond a predetermined position to a non-blocking position in which the blocking member moves the retaining member to disengage the engagement member and the notch to permit pivoting of the seat back when the pivot lock mechanism is in the unlocked position.

11. The vehicle seat assembly of claim 10 wherein the retaining member is slidably mounted on the third pin.

12. The vehicle seat assembly of claim 10 further comprising a comfort adjustment actuator that actuates the pivot lock mechanism to the unlocked position.

13. The vehicle seat assembly of claim 10 further comprising a friction member disposed in contact with the retaining member, wherein friction between the friction member and the retaining member restrains the retaining member from sliding, and wherein movement of the seat back while engaged with the retaining member overcomes the friction restraining the retaining member.

14. The vehicle seat assembly of claim 10 wherein the blocking member engages the engagement member to obstruct the seat back from pivoting forward beyond a predetermined point, wherein the seat back moves the retaining member between a plurality of positions through engagement between the engagement member and the notch.

15. The vehicle seat assembly of claim 14 wherein the seat back is configured to pivot through a defined range having a first end and a second end, the seat back being disposed in a fully reclined position at the first end and being disposed in an easy entry position at the second end, and wherein the plurality of positions does not include a position that corresponds with either the fully reclined position or the easy entry position.

16. The vehicle seat assembly of claim 10 wherein the retaining member pivots together with the blocking member, wherein actuation of the easy entry actuator moves the retaining member such that the notch comes out of engagement with the engagement member, wherein forward movement of the seat back subsequent to actuation of the easy entry actuator causes the engagement member to slide along an upper surface of the retaining member which, in turn, obstructs the blocking member from pivoting back to an obstructing position.

17. The vehicle seat assembly of claim 16 further comprising a biasing member urging the blocking member towards the obstructing position.

18. The vehicle seat assembly of claim 10 wherein the first pin is spaced apart from the retaining member.

19. The vehicle seat assembly of claim 18 wherein a width of the slot exceeds a diameter of the first pin, wherein a gap is formed between first pin and the the slot such that the gap permits the blocking member to pivot within a play range without actuation of the easy entry actuator to permit the engagement member to engage the notch when the seat back pivots forward.

20. A seat assembly comprising:

a seat bottom;

a seat back pivotally disposed on the seat bottom, the seat back having an engagement member;

a pivot lock mechanism disposed on the seat bottom and moveable between a locked position in which pivoting of the seat back is inhibited and an unlocked position in which pivoting of the seat back is enabled; and an actuator assembly disposed on the seat bottom, the actuator assembly including:

an easy entry actuator rotatably disposed on the pivot lock mechanism, the easy entry actuator having a first pin;

a blocking member rotatably disposed on a second pin disposed proximate the seat bottom, the blocking member having a third pin and a slot that receives the first pin; and a retaining member that has a retaining member slot that receives the second and third pins and has a notch for receiving the engagement member;

wherein actuation of the easy entry actuator moves the blocking member from a blocking position in which the seat back is inhibited from pivoting forward beyond a predetermined position to a non-blocking position to disengage the engagement member from the notch and permit pivoting of the seat back.

* * * * *